(12) United States Patent
James

(10) Patent No.: US 8,701,265 B1
(45) Date of Patent: Apr. 22, 2014

(54) CONNECTOR ASSEMBLY FOR ATTACHING A THREADED FASTENER TO A SLOTTED SURFACE

(75) Inventor: Lowell S. James, Marysville, WA (US)

(73) Assignee: The Boeing Company, Chicago, IL (US)

( * ) Notice: Subject to any disclaimer, the term of this patent is extended or adjusted under 35 U.S.C. 154(b) by 92 days.

(21) Appl. No.: 13/212,304

(22) Filed: Aug. 18, 2011

Related U.S. Application Data

(63) Continuation of application No. 12/120,937, filed on May 15, 2008, now Pat. No. 8,002,507.

(51) Int. Cl.
*B21D 39/00* (2006.01)
*B23P 17/00* (2006.01)

(52) U.S. Cl.
USPC ............... 29/525.01; 29/525.02; 29/525.11; 411/85; 411/103; 411/175; 24/297; 24/458

(58) Field of Classification Search
USPC ............... 29/525.11, 525.01, 525.02; 411/11–113, 172–175; 24/297, 581.11, 24/351, 353, 354, 457, 458
See application file for complete search history.

(56) References Cited

U.S. PATENT DOCUMENTS

| | | | | |
|---|---|---|---|---|
| 1,860,384 A * | 5/1932 | Cocks | | 211/30 |
| 2,062,685 A * | 12/1936 | Tinnerman | | 411/174 |
| 2,159,573 A * | 5/1939 | Tinnerman | | 411/112 |
| 2,303,108 A * | 11/1942 | Blackburn | | 248/61 |
| 2,417,269 A * | 3/1947 | Robertson | | 248/61 |
| 2,716,434 A * | 8/1955 | Crowther | | 411/106 |
| 3,060,988 A * | 10/1962 | Munse | | 411/103 |
| 3,212,152 A * | 10/1965 | Tanaka et al. | | 24/647 |
| 4,086,679 A * | 5/1978 | Butler | | 16/4 |
| 4,425,690 A * | 1/1984 | Fraser et al. | | 24/351 |
| 4,676,706 A * | 6/1987 | Inaba | | 411/175 |
| 4,733,988 A * | 3/1988 | Kelly | | 403/373 |
| 4,754,523 A * | 7/1988 | Chein | | 16/223 |
| 4,840,341 A * | 6/1989 | Hasegawa | | 248/316.5 |
| 5,148,581 A * | 9/1992 | Hartmann | | 24/351 |
| RE35,485 E * | 4/1997 | Stewart | | 248/429 |
| 5,799,907 A * | 9/1998 | Andronica | | 248/62 |
| 5,820,322 A * | 10/1998 | Hermann et al. | | 411/85 |
| 5,884,372 A * | 3/1999 | Anscher et al. | | 24/339 |
| 6,164,605 A * | 12/2000 | Drake et al. | | 248/74.3 |
| 6,189,938 B1 * | 2/2001 | Nakadaira et al. | | 292/87 |
| 6,198,042 B1 * | 3/2001 | Huston | | 174/40 R |
| 6,287,064 B1 * | 9/2001 | Jhumra et al. | | 411/175 |
| 6,498,297 B2 * | 12/2002 | Samhammer | | 174/72 A |
| 6,601,798 B2 * | 8/2003 | Cawley | | 244/118.6 |
| 6,708,933 B2 * | 3/2004 | Girodo | | 248/74.2 |
| 6,754,937 B1 * | 6/2004 | Martin | | 24/351 |
| 6,758,645 B2 * | 7/2004 | Curley et al. | | 411/111 |
| 6,872,038 B2 * | 3/2005 | Westlake | | 411/85 |
| 7,036,889 B2 * | 5/2006 | Sanfrod et al. | | 297/463.2 |
| 7,083,437 B2 * | 8/2006 | Mackness | | 439/110 |
| 7,086,874 B2 * | 8/2006 | Mitchell et al. | | 439/110 |
| 7,162,790 B1 * | 1/2007 | Daniels | | 29/525.01 |

(Continued)

*Primary Examiner* — Jermie Cozart
*Assistant Examiner* — Bayan Salone
(74) *Attorney, Agent, or Firm* — Armstrong Teasdale LLP

(57) ABSTRACT

A connector assembly for installation to a surface having a slot pattern. The connector assembly includes a base shell and a clasp shell. The clasp shell movable relative to the base shell between an open position and a closed position, and one of the base shell and the clasp shell includes a threaded insert spaced from an end of the connector.

14 Claims, 11 Drawing Sheets

(56) References Cited

U.S. PATENT DOCUMENTS

| | | | |
|---|---|---|---|
| 7,172,155 B2* | 2/2007 | Feist et al. | 244/118.6 |
| 7,185,850 B2* | 3/2007 | Callahan et al. | 244/118.6 |
| 7,188,805 B2* | 3/2007 | Henley et al. | 244/118.5 |
| 7,523,897 B2* | 4/2009 | Boltz et al. | 248/71 |
| 7,540,066 B2* | 6/2009 | Aoki et al. | 16/4 |
| 7,559,511 B2* | 7/2009 | Yon | 248/68.1 |
| 7,584,573 B2* | 9/2009 | Yoshii et al. | 49/375 |
| 8,002,507 B2* | 8/2011 | James | 411/85 |
| 8,402,605 B2* | 3/2013 | Courtin et al. | 16/4 |
| 8,495,791 B2* | 7/2013 | Yoon | 16/6 |
| 2007/0011844 A1* | 1/2007 | Aoki et al. | 16/4 |
| 2007/0164156 A1* | 7/2007 | Henley et al. | 244/118.5 |
| 2007/0215769 A1* | 9/2007 | Nebeker et al. | 248/220.31 |
| 2010/0122429 A1* | 5/2010 | Gonzalez et al. | 16/4 |

\* cited by examiner

CONNECTOR ASSEMBLY FOR ATTACHING A THREADED FASTENER TO A SLOTTED SURFACE

CROSS-REFERENCE TO RELATED APPLICATIONS

This application is a continuation application of U.S. patent application Ser. No. 12/120,937, filed May 15, 2008 now U.S. Pat. No. 8,002,507, entitled "CONNECTOR ASSEMBLY FOR ATTACHING A THREADED FASTENER TO A SLOTTED SURFACE", the disclosure of which is hereby incorporated herein by reference in its entirety.

BACKGROUND OF THE DISCLOSURE

The field of the disclosure relates generally to mechanical connector assemblies for attaching fasteners in a variety of locations on a slotted surface, and more specifically to a connector assembly adapted to anchor a threaded fastener in a plurality of locations upon a seat rail of an aircraft.

Generally, aircraft are sold to airline companies as an engine and fuselage which the particular airline companies may customize. The aircraft manufacturer generally manufactures aircraft for a wholesale or general market allowing the airlines to make additions and changes to the aircraft. Generally, airline companies install additional and supplementary elements, such as seats, In-Flight Entertainment system components, and galleys, into the aircraft after the aircraft has been completed, but before delivery. These additional elements assist or are useful to the passengers and may include newer or additional technology components. Some of these components include personal computer power outlets, phones, and the components capable of providing multiple video channel, audio channels, and data management.

Many of these components are installed into the seats themselves so that they can be accessed by passengers sitting in each seat. Currently, many seats in commercial aircraft include passenger control units, which control functions such as attendant call, a seat video display, a phone, or computer interface. Wiring bundles connect all of the seats and electronic components. The wiring bundles comprise all of the necessary electrical cabling. The wiring bundles may run beneath the seats and from seat to seat connecting the various components.

In light of ever-increasing complexity of aircraft systems and different needs of aircraft customers, providing flexible wiring options to meet the varying needs of aircraft companies and different configurations of aircraft systems has become a challenge.

BRIEF DESCRIPTION OF THE DISCLOSURE

Consistent with exemplary embodiments disclosed, a connector assembly is disclosed that comprises: a base shell having a first end, a second end a first longitudinal length between the first and second ends; and a clasp shell attached to the base shell, the clasp shell having a first end a second end and a second longitudinal length extending between the first and second ends, the clasp shell movable relative to the base shell between an open position and a closed position; wherein one of the base shell and the clasp shell comprises a threaded insert spaced from the first end.

Optionally, the other of the base shell and the clasp shell comprise an opening providing access to the threaded insert when the clasp shell is in the closed position. One of the base shell and the clasp shell may comprise a hinge pin at the first end, and the other of the base shell and the clasp shell may comprise a retainer at the first end, with the retainer receiving the hinge pin. One of the base shell and the clasp shell may comprise a latch surface at the second end, and the other of the base shell and the clasp shell may comprise a retainer surface for the latch. One of the base shell and the clasp shell comprises a finger pull at the second end. The longitudinal lengths of the base shell and the clasp shell may not be equal. The base shell and the clamp shell may be fabricated from plastic.

The assembly may optionally further comprises a threaded fastener engaging the threaded insert. The threaded fastener may attach one of a wire support, a conduit support and a cable support to the threaded insert.

In another aspect, a connector assembly is disclosed comprising: a seat rail having a surface with at least a first slot and a second slot extending therethrough, the first and second slots separated by a distance; and a connector attachable to the slotted surface, the connector comprising a base shell and a clasp shell each having opposing first and second ends, the clasp shell being hingedly attached to the base shell at the first end, the clasp shell being configured to latch to the base shell at the second end, and the base shell and the clasp shell extending longitudinally for a distance between the first and second ends that is greater than the distance separating the first and second slots; wherein one of the base shell and the clasp shell comprises a threaded insert; and wherein one of the base shell and the clasp shell is insertable through the first slot and extendable to the second slot whereby the threaded insert is accessible through the second slot; and wherein the other of the base shell and the clasp shell is movable to a latched position, thereby engaging the base shell and the clasp shell to the slotted surface between the first and second slots.

Optionally, the other of the base shell and the clasp shell may comprise an opening providing access to the threaded insert through the second slot when the clasp shell is in the closed position. One of the base shell and the clasp shell may comprise a hinge pin at the first end, and the other of the base shell and the clasp shell may comprise a hinge retainer at the first end, with the hinge retainer receiving the hinge pin. One of the base shell and the clasp shell may comprise a latch surface at the second end, and the other of the base shell and the clasp shell may comprise a retainer surface for the latch. One of the base shell and the clasp shell may comprise a finger pull at the second end. A threaded fastener may engage the threaded insert and may attach one of a wire support, a conduit support and a cable support to the threaded insert. The first longitudinal length and the second longitudinal length may not be equal, and the base shell and the clamp shell may be fabricated from plastic.

In still another aspect, a connector assembly for engaging a slotted surface having at least a first slot and a second slot separated by a distance is disclosed. The connector assembly comprises: a base shell having a first end, a second end, and a first longitudinal length extending between the first and second ends; and a clasp shell having a first end, a second end, and a second longitudinal length extending between the first and second ends; the clasp shell hingedly attached to the base shell at the first end, the clasp shell movable relative to the base shell between an open position and a closed position; wherein the base shell comprises a threaded insert spaced from the first end by a distance greater than the distance between the slots; and wherein the second ends of the base shell and clasp shell are configured to latch with one another and retain the base shell and the clasp shell to the slotted surface between the first and second slots with the threaded insert located proximate one of the first and second slots.

Optionally, the base shell and the clasp shell are fabricated from plastic.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION

Exemplary embodiments of connector components and methods are disclosed herein below that facilitate versatile mounting of various types of wiring and cabling support elements in user-selected locations on a surface having a slot cutout pattern. The slot cutout pattern may be found, for example, in a lower flange of, for example, a seat track of an aircraft or another component or surface. Mounting provisions for different wiring and cabling systems may be installed to a the seat track structure without requiring special modifications to the geometry of the seat track. A versatile, self-locating, and tool-less connector assembly and method of installation is beneficially provided. The connectors significantly improve the installation ergonomics over conventional techniques while at the same time reducing the part count and weight.

Figure 1:
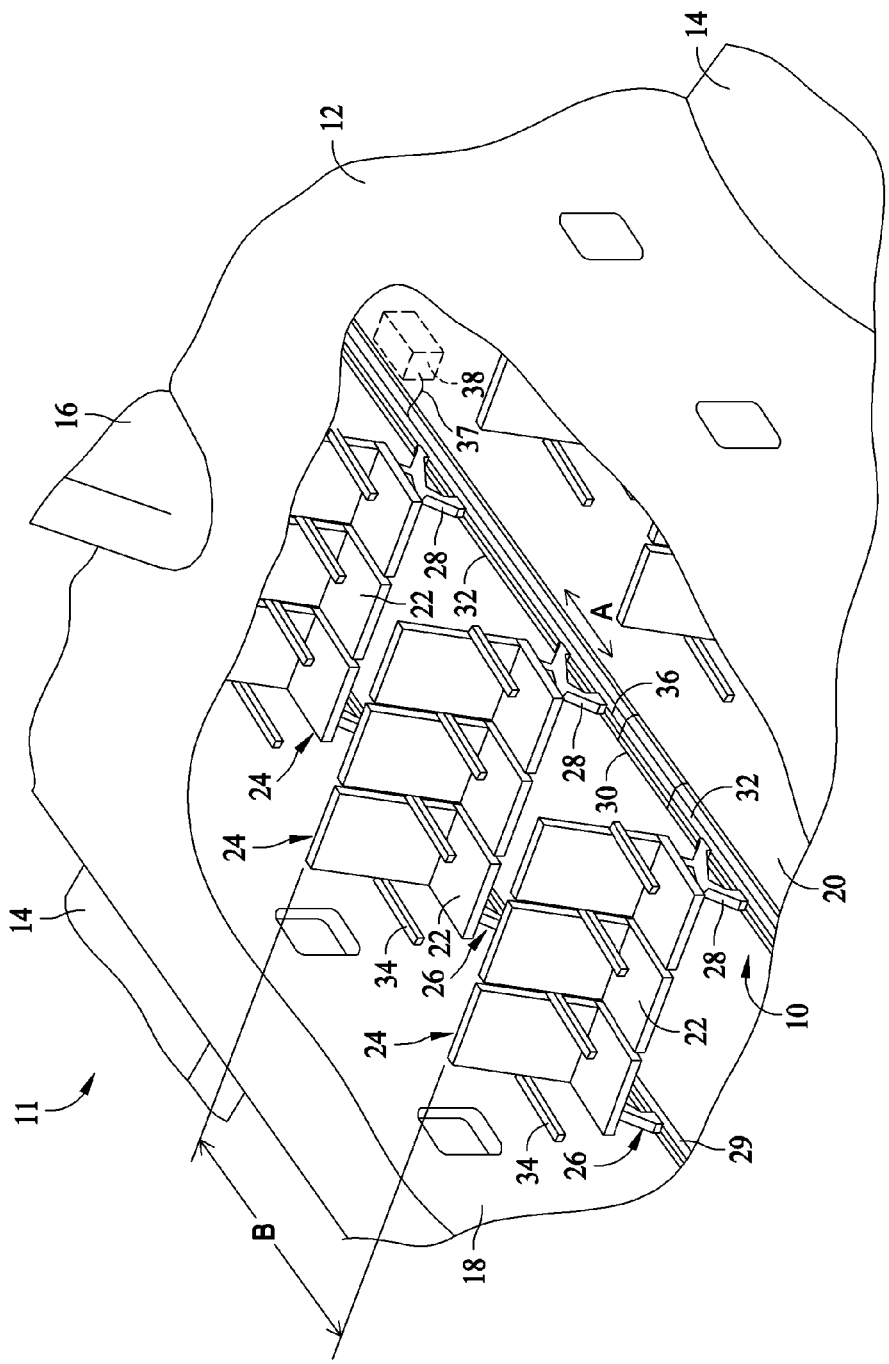
FIG. 1 is a perspective view showing an aircraft having a known seat electrical quick disconnect system.

FIG. 1 is a perspective view of a known seat electrical quick disconnect system 10 that may be installed on an aircraft 11. The aircraft 11 includes a fuselage 12, a pair of wings 14, an elevator 16 and a passenger compartment 18. The passenger compartment 18 includes a deck 20 supporting a plurality of seat groups 22, each having individual occupant seats 24. The seat groups 22 illustrated in FIG. 1 each include three individual occupant seats 24, although it is appreciated that the seat electrical quick disconnect system 10 of the present invention can be used with any quantity of occupant seats 24 forming seat groups 22.

Each seat group 22 is supported by a first seat leg 26 and a second seat leg 28. The first and second seat legs 26, 28 are connected to a first seat rail 29 and a second seat rail 30, respectively. The seat rails 29 and 30 are sometimes referred to as seat tracks. Each of first and second seat rails 29, 30 are provided with a sealing cover 32 positioned between each of the seat legs after they are connected to one of the first or second seat rails 29, 30.

Each occupant seat 24 includes an electrical device connection panel 34. The electrical device connection panels 34 provide passengers in each of the occupant seats 24 with a variety of connections to a plurality of electrical sources. The plurality of electrical sources can include, for example only, an alternating current source, a direct current source, a telephone signal source, an Internet communication signal source, an electronic acoustic signal source, an ARINC signal source such as ARINC 429, and an electronic voice signal source. In one preferred embodiment of the present invention, the electrical sources connected to electrical device connection panels 34 include an alternating current source, a direct current source and an ARINC signal source. Each of the electrical sources are connected to the individual electrical device connection panels 34 via an electrical bus 36 which is positioned within one or both of the first and second seat rails 29, 30 and extends substantially the length of first and second seat rails 29,30. A wiring harness 37 is shown as an exemplary way to connect electrical bus 37 to any of the remotely located electrical sources. The location for each of the electrical sources connectable to seats 24 can be positioned throughout aircraft 11.

Figure 2:
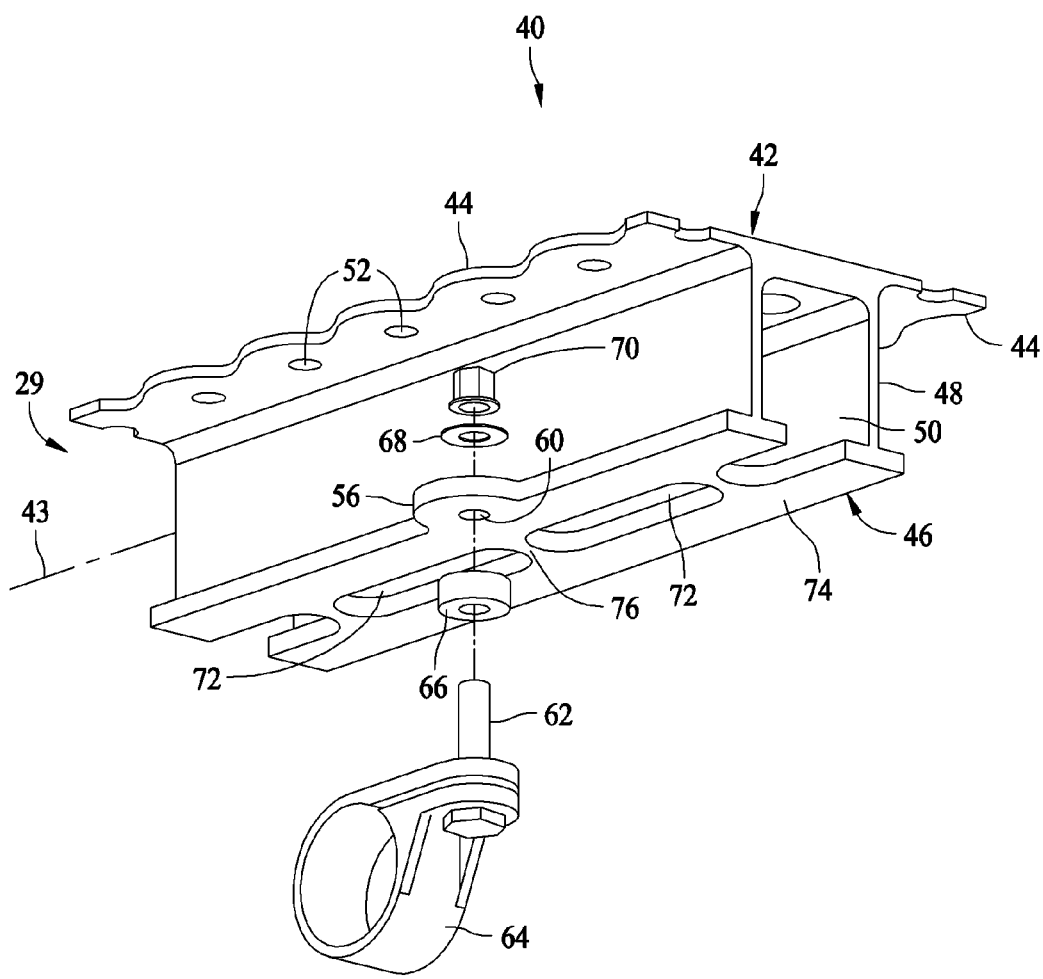
FIG. 2 is a partial exploded view of a known connector assembly for supporting cabling in the electrical quick disconnect system shown in FIG. 1.

FIG. 2 is a partial exploded view of a known connector assembly 40 for supporting cabling for the quick disconnect system 10 shown in FIG. 1. A portion of a known seat rail 29 is shown, and the seat rail 30 may be of similar construction to the seat rail 29 in the disconnect system 10 shown in FIG. 1.

The seat rail 29 is formed as an elongated body 42 extending along a longitudinal axis 43 and having opposed upper and lower flanges 44 and 46 interconnected by a web 48. Reminiscent of a box beam construction, the flanges 44 and 46 overhang the web 48 on either side thereof. The seat rail 29 may be recognized by those in the art as a Pi-Box style seat track or rail. The web 48 extends between upper and lower flanges 44 and 46 defines an open cavity 50 that may receive, for example, the electrical bus 36 (FIG. 1). A plurality of sections of seat rail 29 may be provided and installed end-to-end in the passenger cabin 18, or alternatively, the seat rail 29 may be formed as one elongated piece if desired. The seat rail is typically formed from a structural metal material, such as titanium, in accordance with known methods and techniques.

The upper flange 44 is provided with a plurality of fastener holes 52 that are aligned along the longitudinal axis 43 and spaced relatively close to one another along either peripheral side edge of the upper flange 44, and potentially elsewhere in the upper flange 44. The upper flange 44 supports the first and second seat legs 26, 28, respectively, with the upper flange 44 coupled to the seat legs 26, 28 with known fasteners. The seat rail 29 may also be coupled to a fuselage floor beam (not shown) using a plurality of fasteners and some of the fastener holes. The seat rails 29 may also support a floor of passenger compartment 18 (FIG. 1) using a plurality of fasteners as known in the art. The number of fastener holes 52 in the upper flange 44 generally accommodates attachment of the seat legs 26, 28 in various locations in the passenger cabin 18 (FIG. 1) as desired.

The lower flange 46 of the seat rail 29 includes a laterally extending tab or flare 56 on a peripheral edge of the flange 46. The flare 56 accommodates and in part defines a fastener hole 60 that may receive a fastener 62, which may be a threaded fastener familiar to those in the art. The fastener 62 may couple, for example, a conduit support 64 that receives a conduit in which wiring and cabling may extend to and from electronic devices and electrical sources. The fastener 62 may be utilized with, for example, a spacer element 66 to achieve minimum system-structure separation requirements, a washer 68 and a nut 70 to clamp the conduit support 64 to the lower flange 44 at the flare 56. Typically, a number of such flares 56 are spaced from one another along the longitudinal axis 43 of the same or different sections of seat rail 29, with each flare 56 receiving a fastener 62 and conduit support to support the same or different conduits from the seat rail. Such a pre-drilled fastener hole 60 and flare 56 are common in the lower flange 46 of conventional seat rails 29.

As also shown in FIG. 2, the lower flange 46 includes a series of slots 72 extending through the major surface 74 of the flange 46. The slots 72 are aligned along the longitudinal axis 43 and are separated from one another by a connecting piece 76 of the flange 46, sometimes referred to as a bridge section. The slots 72 serve primarily as weight reduction features in the seat rail 29. FIG. 2 illustrates a standard slot cutout pattern for seat rail weight reduction.

One drawback of such a seat rail 29 is that the flares 56 are fixed in their location on the lower flange 46, presenting practical limits on the placement of conduit supports 64 on the seat rail 29 that can be less than ideal for some configurations of seats or wiring systems associated with the seats. While custom designed seat rails could be manufactured with the flares at predetermined and desired locations, custom tooling of such parts and associated expenses in producing them renders this an impractical option. Not only would customized seat rails be expensive, they would not be amenable to future reconfigurations of cabling systems after they are installed, and any unused structural provisions such as the flares described above in the seat track would introduce additional weight to the aircraft with no corresponding benefit.

Additionally, another drawback is presented in that the fastener 62 and the associated elements 66, 68, 70 require tools and some dexterity to install them on the flares 56. The spacer element 66, the washer 68 and the nut 70 are prone to being mishandled and dropped during installation, or otherwise misplaced or lost, resulting in installation delays and difficulties in locating and properly assembling the fastener elements 62, 66, 68 and 70.

It would be desirable to provide a connector assembly that can be more flexibly used at different locations on the flange 46 and that is less difficult to install on the seat rail 29.

Figure 3:
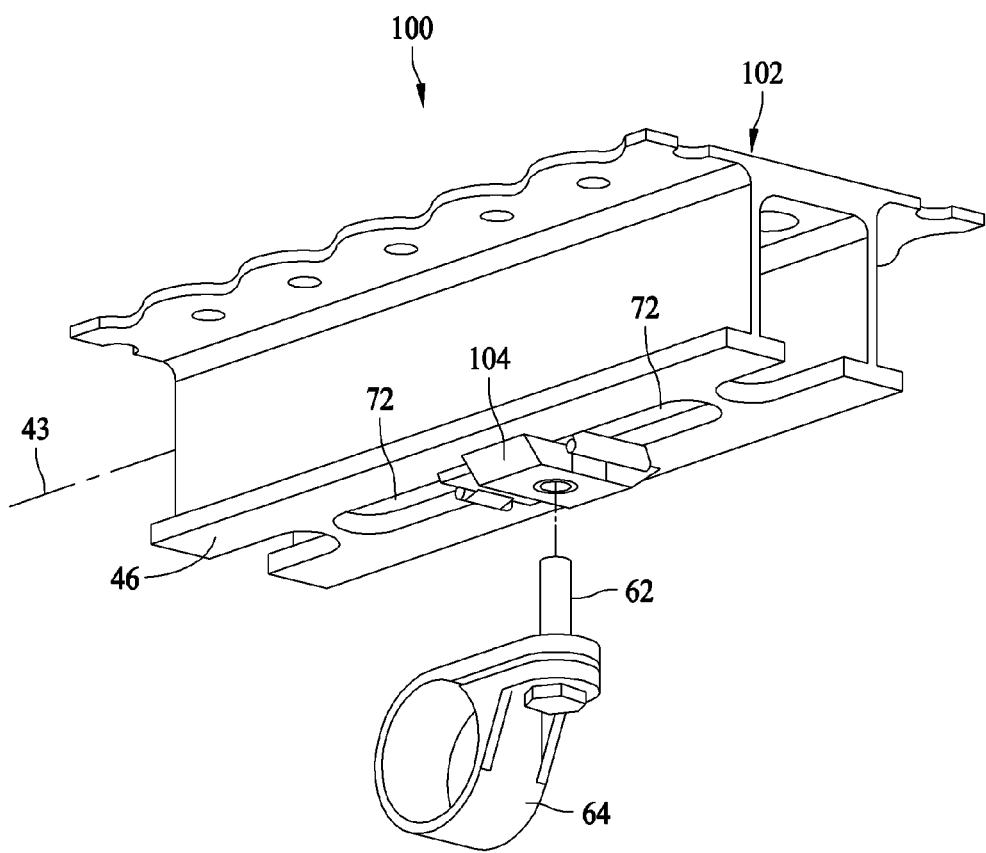
FIG. 3 is an exploded view of an exemplary inventive connector assembly for supporting cabling in the electrical quick disconnect system shown in FIG. 1.

FIG. 3 is an exploded view of an exemplary inventive connector assembly 100 for supporting cabling in the disconnect system shown in FIG. 1.

As seen in FIG. 3, the assembly 100 includes a seat rail 102, the fastener 62 and the conduit support 64. The seat rail 102 is similar to the seat rail 29 shown in FIG. 2, but does not include the flare 56 or the fastener hole 60 on the periphery lower flange 46.

Unlike the assembly 40 shown in FIG. 2 where the fastener 62 attaches to the flare 56, the assembly 100 shown in FIG. 3 includes an exemplary clasp connector 104 that attaches to the connecting piece 76 (FIG. 2) between adjacent slots 72 on the lower flange 46 of the seat rail 102. The clasp connector 104 directly receives the fastener 62 as explained below, and the spacer element 66, the washer 68 and the nut 70 shown in FIG. 2 are not required to fix the conduit support 64 to the seat rail 29. Also, because the flare 56 (FIG. 2) is no longer necessary by virtue of the connector 104, the flare 56 may be eliminated in the rail 102, thereby lowering machining costs to produce the rail 102 and lowering the overall weight of the rail 102 when compared to the rail 29. Alternatively stated, the assembly 100 provides for supporting system transport element support brackets and clamps from the underside of a seat track 102 without adding special modifications and provisions to the track structure, such as the aforementioned flares 56 (FIG. 2) in the edge periphery of the lower flange, drilled holes, and related cap material gage pad-ups, which would add additional weight and track production cost.

As will be appreciated below, the clasp connector 104 provides a self-indexing part which utilizes the standard geometry of the seat rail 102, thereby eliminate locating tooling for installation of a cabling system. The clasp connector 104 does not require hand tools to install, thereby improving production flow.

Figure 4:
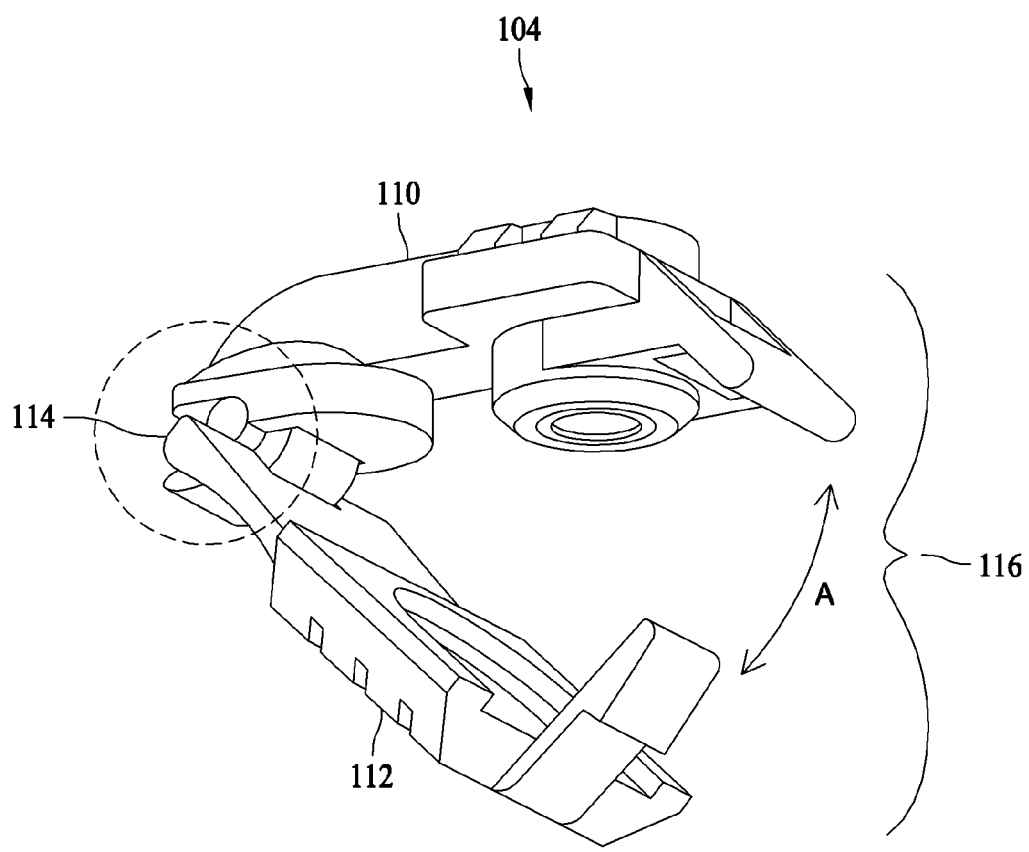
FIG. 4 is a perspective view of a clasp connector for the assembly shown in FIG. 3.

FIG. 4 is a perspective view of the exemplary clasp connector 104 for the assembly 100 shown in FIG. 3. The clasp connector 104 includes a base shell 110 and a clasp shell 112 that are pivotally connected to one another at a first end 114. The shells 110 and 112 are pivotal at the first end 114 relative to one another such that mating surfaces at a second end 116 of the connector 104 may be separated or brought closer together as indicated by the arrow A. That is, the shells 110 and 114 are positionable relative to one another between an open position as shown in FIG. 4 and a closed position described below wherein the shells 114 may be clasped or otherwise coupled at the second end 116.

Figure 5:
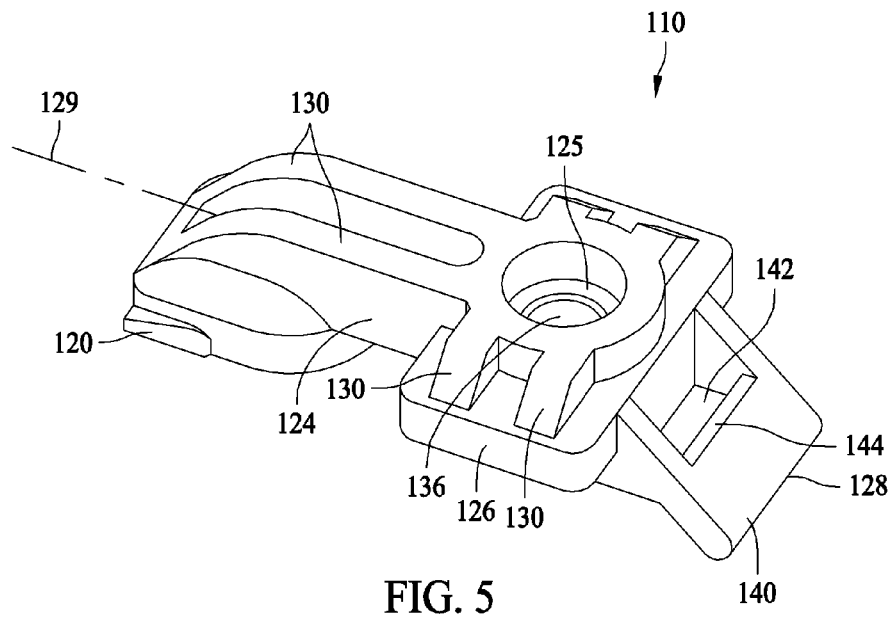
FIG. 5 is a top perspective view of a base shell for the connector shown in FIG. 3.
Figure 6:
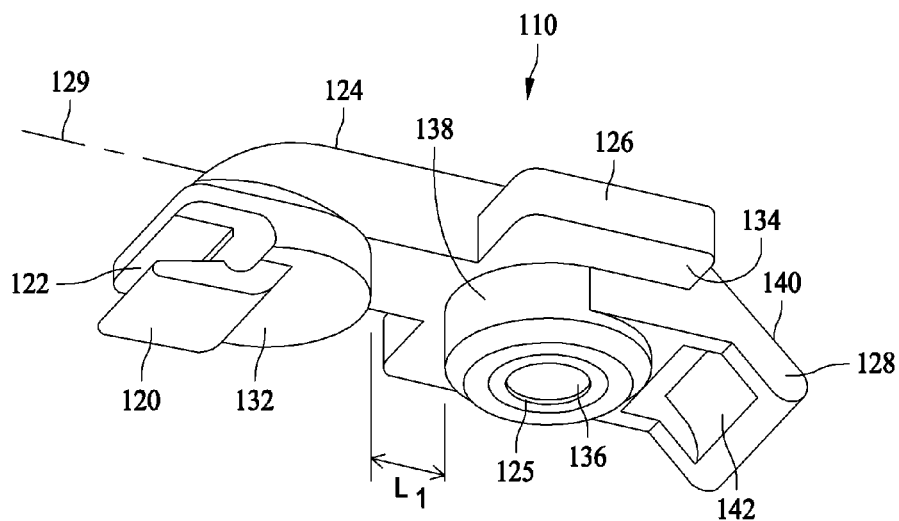
FIG. 6 is a bottom perspective view of the base shell shown in FIG. 5.

FIGS. 5 and 6 are top and bottom perspective views, respectively of the base shell 110 in an exemplary embodiment. The base shell 110 includes a hinge section 120 defining a retainer in the form of a hinge slot 122, an extension section 124 extending from the hinge section 120, a fastener section 126 extending from the extension section 124 and including a threaded insert 125, and a latch section 128 extending from the fastener section 126. The base shell 110, including each of the sections 120, 124, 126 and 128 may be fabricated from a lightweight plastic material or other suitable material known in the art, and the threaded insert 125 may be fabricated from metal or another suitable material. The base shell 110 may, for example, be molded over the insert 125 in a known manner, or the threaded insert 125 may be provided separately and may be assembled to the base shell 110.

As shown in FIGS. 5 and 6, the base shell 110 is generally elongated between the hinge section 120 at one end thereof, and the latch section 128 at an opposing end thereof. The sections 120 124, 126, 128 extend axially along a longitudinal axis 129 and are dimensioned to be inserted through the slots 72 (FIG. 3) in the seat rail 102 as further explained below. The threaded insert 125 is oriented generally perpendicular to the longitudinal axis 129 in the embodiment depicted, although perhaps it may be oriented differently in another embodiment, including but not limited to obliquely to the perpendicular axis.

The extension section 124 and the fastener section 126 may be contoured as shown with reinforcing ribs 130 (FIG. 5) and the like that provide both structural strength and rigidity as well as a reduced amount of material than the base shell 110 would otherwise entail without such a contour. The extension section 124 may also include an engagement pad 132 (FIG. 6)

that engages a corresponding portion of the clasp shell 112 (FIG. 4) in use. The engagement pad 132 extends in a generally planar orientation and is generally parallel to the longitudinal axis. The pad 132 may have a curved outer periphery as shown or may have another shape if desired.

The fastener section 126 in the illustrated embodiment includes clasp pad 134 (FIG. 6) that abuts a corresponding portion of the clasp shell 112 (FIG. 4) when in the closed position. The clasp pad 134 extends as a planar surface that is generally parallel to the longitudinal axis 129 and also parallel to, but generally offset from the engagement pad 132. That is, the pads 132 and 134 are at different elevations from one another.

The threaded insert 125 is generally centrally located in the fastener section 126, and is accessible through a bore 136 from above and below. A guide face 138 (FIG. 6) extends from below at a distance from the clasp pad 134. The guide face 138 may have a curved outer periphery as depicted or may be alternatively shaped if desired.

The extension section 124 extends longitudinally for an axial distance sufficient to bridge the connecting piece 76 (FIG. 2) between slots 72 (FIGS. 3 and 4) on the seat rail 102 (FIG. 3). Specifically, a distal end of the engagement pad 132 and a distal end of the guide face 138 along the longitudinal axis are spaced from one another by an amount $L_1$, measured along the longitudinal length 129, that is approximately equal to or larger than a corresponding length of the connecting piece 76 (FIG. 2) measured along the longitudinal axis 43 of the seat rail between the slots 72 (FIGS. 2 and 3).

The latch section 128 includes an inclined ramp section 140 and a clasp opening 142. As shown in FIGS. 5 and 6, the ramp section 140 extends at an oblique angle to the longitudinal axis 129, while the clasp opening 142 extends generally perpendicular to the longitudinal axis 129. The latch section 128 defines a retainer surface or locking ledge 144 (FIG. 5) adjacent the clasp opening 142. The ramp section 140 extends downwardly from the locking ledge 144 and defines a finger pull for operating the latching surfaces of the latch section 128 and a complementary portion of the clasp shell 112.

While one exemplary shape and configuration of the base shell 110 is depicted, it is contemplated that the base shell 110 may be otherwise shaped and configured in further and/or alternative embodiments.

Figure 7:
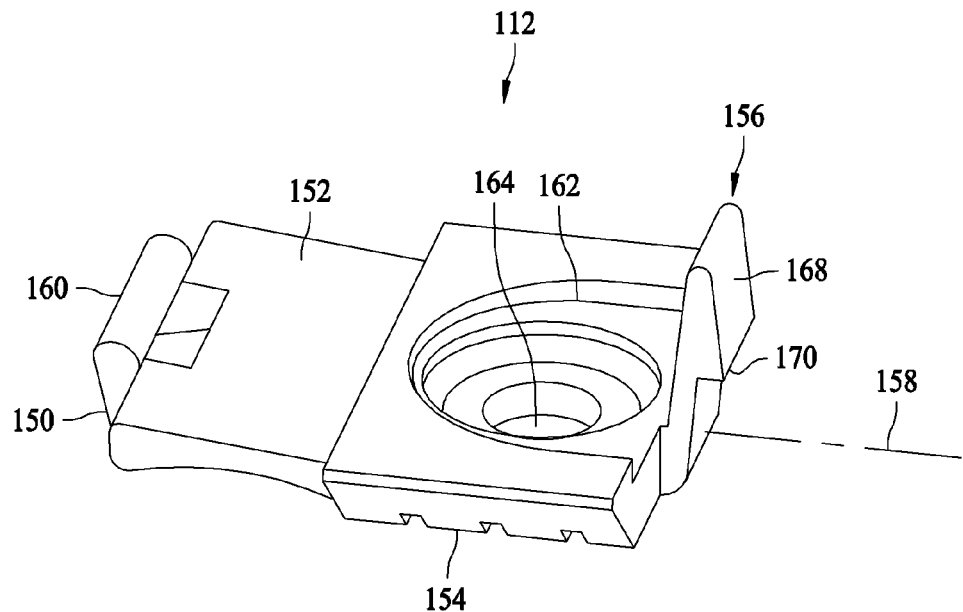
FIG. 7 is a top perspective view of a clasp shell for the connector shown in FIG. 3.
Figure 8:
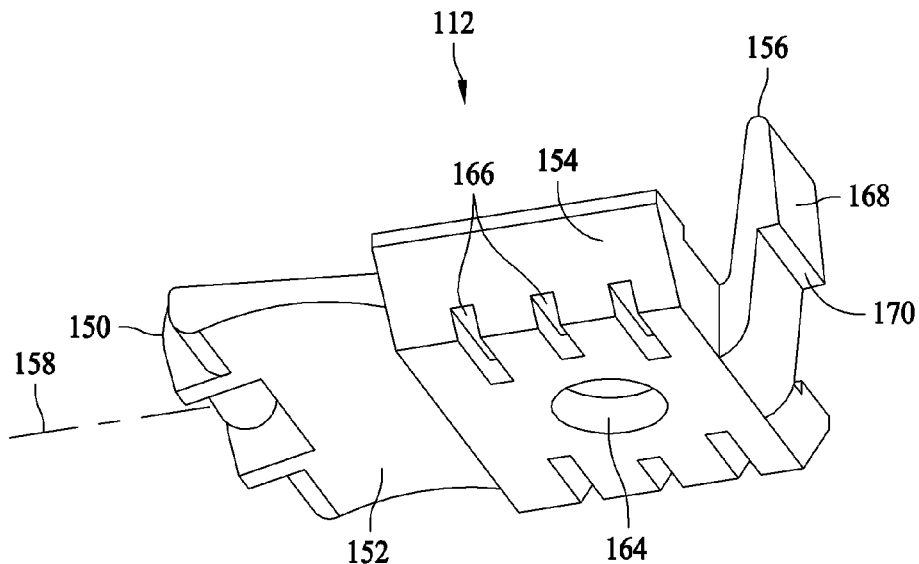
FIG. 8 is a bottom perspective view of the clasp shell shown in FIG. 7.

FIGS. 7 and 8 are a top perspective view and a bottom perspective view, respectively of the clasp shell 112. The clasp shell 112 includes a hinge section 150, an extension section 152, a fastener section 154, and a latch section 156. The sections 150, 152, and 154 extend axially along a longitudinal axis 158. The latch section 156 extends generally perpendicular to the longitudinal axis 158, although the latch section 156 could be otherwise oriented in another embodiment. Comparing FIGS. 7 and 8 with FIGS. 5 and 6, the longitudinal length of the clasp shell 112 is less than the longitudinal length of the base shell 110. The clasp shell 112, including each of the sections 150, 152, 154 and 156 may be fabricated from a lightweight plastic material or other suitable material known in the art. In different embodiments, the clasp shell 112 may be fabricated from the same or different material as the base shell 110.

The hinge section 150 in the illustrated embodiment defines a latch pin 160 (FIG. 7) extending above the extension section 152, and the latch pin 160 is received in the hinge slot 122 (FIG. 6) of the base shell 110 when the connector 104 is assembled as shown in FIG. 4. The latch pin 160 and the hinge slot 122 allow the base shell 110 and the clasp shell 112 to move relative to one another in the directions indicated by arrow A in FIG. 4. The latch pin 160 may be engaged to the hinge slot 122 with, for example, snap-fit engagement.

The extension section 152 extends longitudinally along the axis 152 for at least the distance $L_1$ (FIG. 6). The fastener section 154 includes a guide recess 162 and an opening or bore 164 extending through the fastener section 154 from above and below. The guide recess 162 receives the guide face 138 (FIG. 6) of the base shell 110 when the shells 110 and 112 are closed. In use, the fastener 62 (FIG. 3) may be extended through the opening 164 and into the threaded insert 125 (FIG. 3) when the connector 104 is assembled and installed to the seat rail 102. As shown in FIG. 8, the fastener section 154 may include slots or cutouts 166 for material savings and weight reduction purposes. While a generally rectangular shaped of the fastener section 154 is illustrated, it is contemplated that other shapes may likewise be utilized if desired.

The latch section 156 includes a wedge shaped barb 168 and a locking ledge 170 at its distal end. The barb 168 and the locking ledge 170 are extendable through the clasp opening 142 (FIGS. 5 and 6) and are used to releasably retain the clasp shell 112 to the base shell 110 at the second end 116 (FIG. 4). When the locking ledge 170 of the barb 168 clears the locking ledge 144 (FIG. 5) of the base shell 110, the barb 168 is lockable to the latch section 128 of the base shell 110 with the locking ledge 170 of the barb 168 engaged and retained to the locking ledge 144 of the base shell 110. The latch section 156 of the clasp shell 112 may exhibit some resiliency so that the barb 168 is effectively self-latching to the latch section 128 of the base shell 110 in use.

While one exemplary shape and configuration of the base shell 112 is depicted, it is contemplated that the base shell 112 may be otherwise shaped and configured in further and/or alternative embodiments.

It should be apparent from the foregoing FIGS. 5-8 that certain features of the base shell 110 could alternatively be provided in the clasp shell 112 instead, and that certain features of the clasp shell could likewise be provided in the base shell 110 in other embodiments. Many, if not all of the opposing mating features of the shells 110 and 112 could reversed if desired to produce many variations of clasp connectors with similar, if not identical functionality. For example, the threaded insert 125 could alternatively be provided in the clasp shell instead of the base shell 110, and the latch barb 168 could alternatively be provided in the base shell 110 instead of the clasp shell 112.

Figure 9:
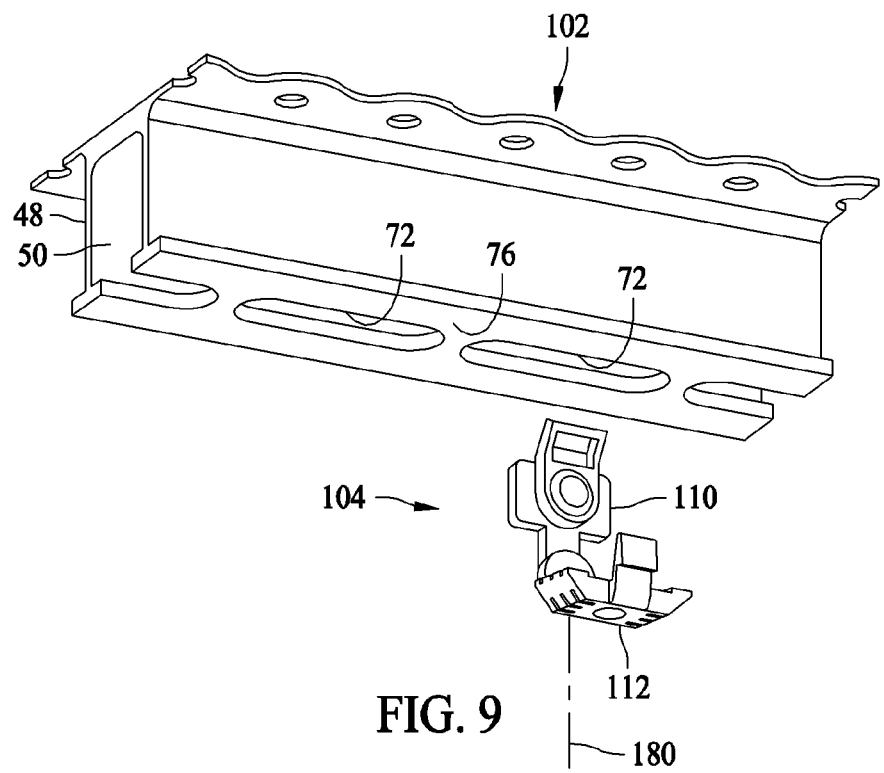
FIG. 9 illustrates the clasp connector at a first stage of installation to a slotted surface.

FIGS. 9-12 illustrate the clasp connector 104 being installed to the seat rail 102. First, as shown in FIG. 9, the base shell 110 and the clasp shell 112 are connected to one another at the first end 114 (FIG. 4) as described, and the connector 104 is pivoted at the hinge to open the base shell 110 at approximately a 90° angle relative to the clasp shell 110. The connector 104 is then raised toward one of the slots 72 in the seat rail 102 with the base shell 110 oriented substantially perpendicular to the slot. As such the base shell 110 may be inserted through the slot and into the cavity 50 in the web 48 of the seat rail 102.

Figure 10:
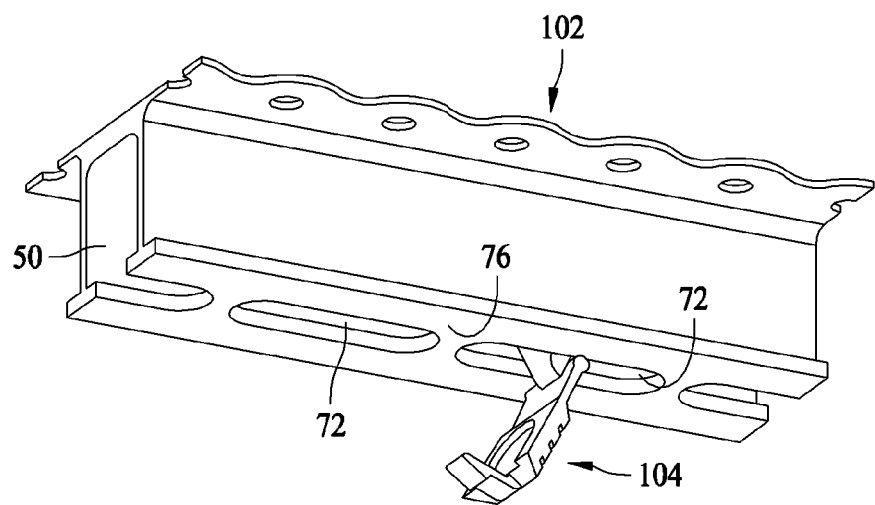
FIG. 10 illustrates the clasp connector at a second stage of installation to a slotted surface.
Figure 11:
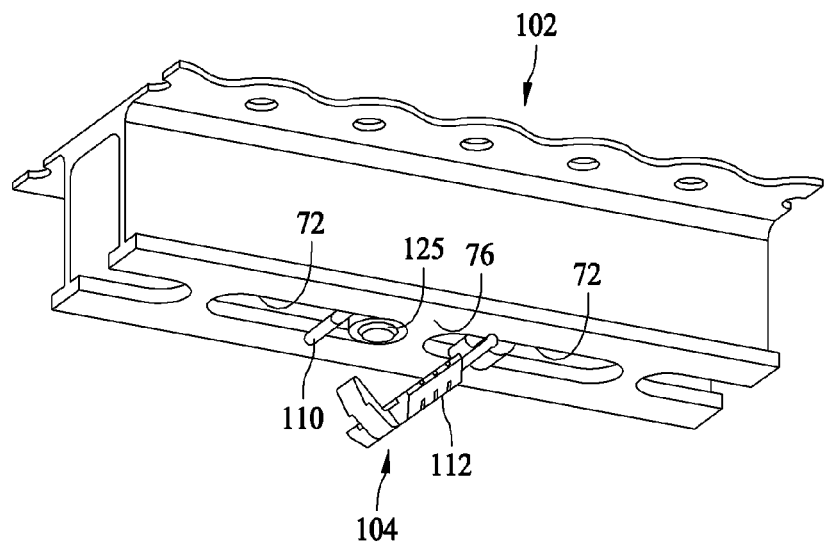
FIG. 11 illustrates the clasp connector at a third stage of installation to a slotted surface.
Figure 12:
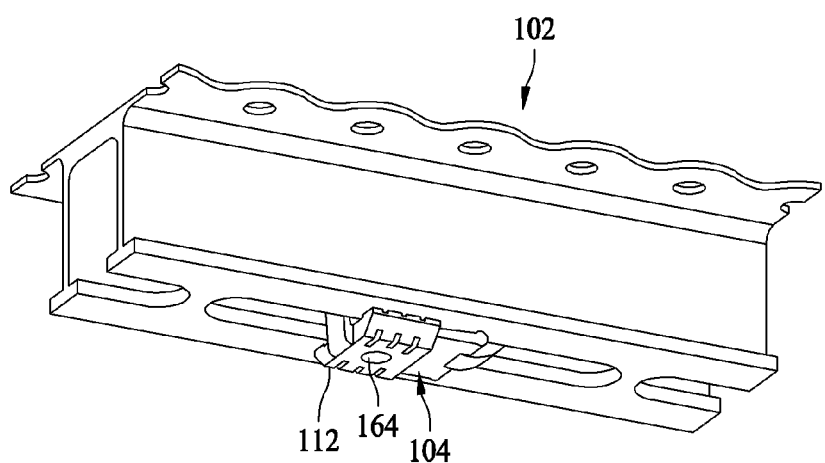
FIG. 12 illustrates the clasp connector at a fourth stage of installation to a slotted surface.

As shown in FIG. 10, once the base shell 110 is inside the cavity 50, the connector 104 may be rotated approximately 90° about a vertical axis 180 (FIG. 9), and as shown in FIG. 10 the base shell 110 may be partly extended through the adjacent slot such that the base shell 110 occupies a portion of each adjacent slot 72 on either side of the connecting piece 76 between the slots 72. At this point, and as shown in FIG. 12, the clasp shell 112 may be closed over the connecting piece 76 and latched to the base shell 110. The connector 104 may be installed quickly by hand and without using tools. The connector 104 may likewise be uninstalled with finger operation of the latch elements in the base shell 110 and the clasp shell 112. The connector 104 allows for much location variability on the rail 102, can be installed by hand at most seat rail slot positions, and can be easily removed and repositioned without special tools, thereby facilitating changes to wiring and cabling routing in production or post-production.

When the connector 104 is latched as shown in FIG. 12, the fastener 62 (FIG. 3) may be inserted through the opening 164 in the clasp shell 112 and may engage the threaded insert 125 (FIG. 12) in the base shell 110. The connector 104 is constructed, for example, to carry a 65-lb load (equivalent weight of four—1.00 dia. wire bundles under 9 g flight conditions) in all directions.

It is contemplated that variations of this installation methodology may alternatively be utilized. For example, the clasp shell 112 could alternatively be inserted through one of the slots 72 into the web cavity 50 and the base shell 110 could be clasped over the connecting piece 76 and exposed on the outer surface of the seat rail 102 if desired. Also, bearing in mind that the opposing mating features of the shells 110 and 112 may be swapped in different embodiments, varying methods of installation may be necessitated.

Figure 13:
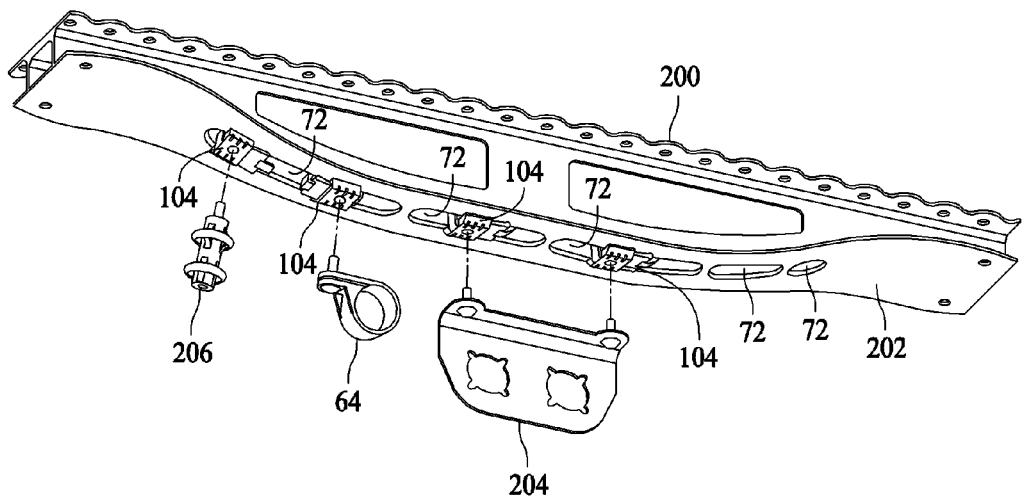
FIG. 13 illustrates another slotted surface having a plurality of clasp connectors and a plurality of cabling support elements.

FIG. 13 illustrates another embodiment of a seat rail 200 having a plurality of clasp connectors 104 that support a plurality of different cabling support elements. The lower flange 202 of the seat rail 200 has a curved profile and many slots 72. The connectors 104 may be provided at any convenient point between any two of the slots 72, and as shown one slot may accommodate two connectors 104 at opposing ends of the slot. Additionally, more than one connector 104 may cooperate to support a single support element, or each connector may be associated with a different support element. The connectors 104 may be shaped and dimensioned to be the same or different from one another to accommodate various types of support elements. As illustrated in FIG. 13, the connectors 104 may couple to a bracket support 204, the conduit support 64, or a wire support 206 to accommodate different cabling needs. Still other support elements are possible that may accommodate different cabling and wiring installations on the seat rail 200.

Figure 14:
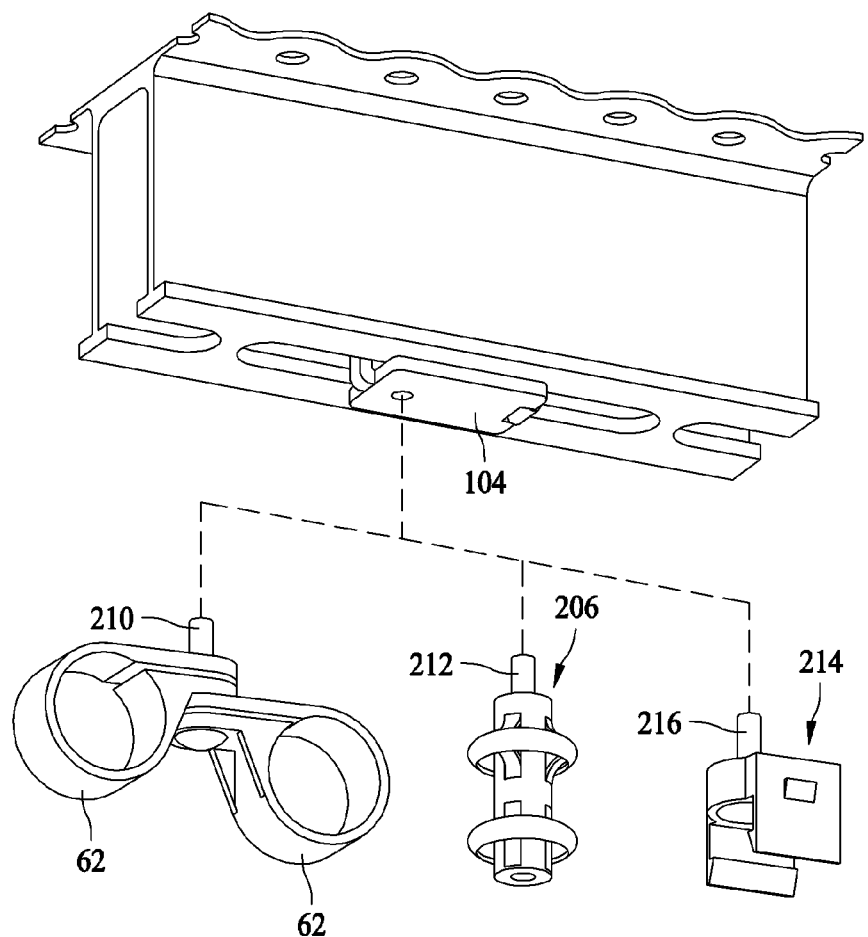
FIG. 14 illustrates exemplary support elements for use with clasp connectors on a slotted surface.

FIG. 14 illustrates that a single connector 104 may capably support more than one different type of support element having a common or standardized fastener structure. For example, two conduit supports 62 may be coupled end-to-end to the connector 104 using a single fastener 210. A wire support 206 could alternatively be utilized having another fastener 212 that also is compatible with the connector 104. Still further, a mounting element 214 for a channel support may be installed to the connector 104 with a compatible fastener 216.

Figure 15:
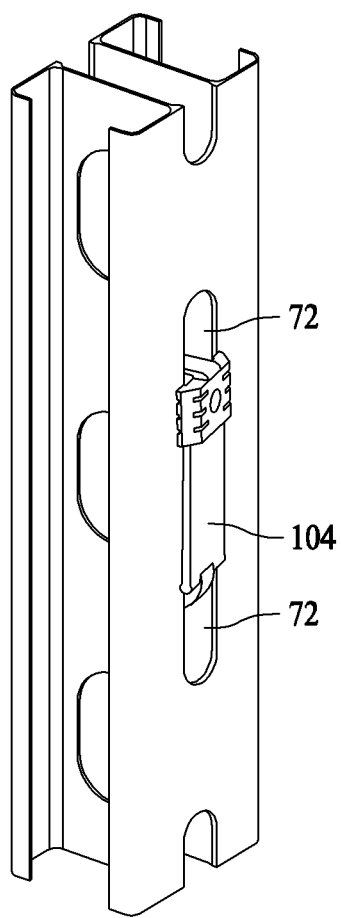
FIG. 15 illustrates an exemplary clasp connector on another exemplary slotted surface.

Although the embodiments disclosed are configured for use on a Pi-Box style seat track, it is appreciated that the concepts could be adapted to other structures or components with similar slot penetration patterns, including but not limited to weight reduction slot features of a passenger floor vertical stanchions for an aircraft. Such an embodiment is shown in FIG. 15 wherein a clasp connector 104 attached to a surface having vertically oriented slots 72, as opposed to the general horizontally extending slots in the embodiments described above. It is further contemplated that the clasp connectors 104 may be beneficial for non-aircraft structures and other assemblies than the above-described electrical quick disconnect system.

The many benefits of the connector assemblies described above include reduced production line cost due to simple part installations without tooling and involving shorter mechanic touchtimes, and reduced part cost because the connectors 104 are manufacturable with simple injection molded techniques and can be mass produced. Additionally, engineering costs related to designing special feature provisions in the geometry of the seat rail in order to accommodate conventional attachment methods are avoided. Variation in the seat rails is also reduced, which equates to lower seat track machining costs. Simple in-service, system adjustment/reconfiguration is provided due to the ability to relocate system support devices longitudinally on the seat track without requiring structural modifications of the seat rail. In order to have the same level of system adjustment variability with the conventional structure shown in FIG. 2, the seat rail would need to include multiple flares, many of which would be un-used for the life-cycle of the aircraft.

While the concepts disclosed have been described in terms of various specific embodiments, those skilled in the art will recognize that the concepts can be practiced with modification within the spirit and scope of the claims.

What is claimed is:

1. A method for attaching a device proximate a component incorporating a slotted surface, said method comprising:
   inserting one of a base shell and a clasp shell of a connector assembly into one slot of the slotted surface, the base shell and the clasp shell hingedly attached to one another by a hinge pin that engages a retainer, the hinge pin formed on one of a first end of the base shell and a first end of the clasp shell, and the retainer formed on the other of the base shell first end and the clasp shell first end;
   engaging a latch section formed on one of a second end of the clasp shell and a second end of the base shell with a clasp opening formed on the other of the clasp shell second end and the base shell second end to engage the connector assembly with the slotted surface; and
   engaging a threaded insert attached to one of the base shell and the clasp shell with a threaded fastener configured for engagement with the device, wherein the threaded insert is positioned between the hinge pin and the latch section.

2. The method of claim 1 wherein engaging a threaded insert comprises providing an opening in at least one of the base shell and the clasp shell to provide access to the threaded insert when the clasp shell is engaged with the base shell.

3. The method of claim 1 further comprising configuring the clasp opening as a finger pull.

4. The method of claim 1 wherein engaging the latch section with the clasp opening comprises engaging a locking ledge of the clasp opening with a barb formed in the latch section.

5. The method of claim 1 further comprising attaching one of a wire support, a conduit support and a cable support to the threaded insert with the threaded fastener.

6. The method of claim 1 wherein inserting one of a base shell and a clasp shell comprises hingedly attaching a base shell having a first longitudinal length to a clasp shell having a second longitudinal length, wherein the first longitudinal length and the second longitudinal length are not equal.

7. The method of claim 1 wherein engaging a latch section with a clasp opening comprises engaging the latch section with the clasp opening within a second slot of the slotted surface.

8. A method for attaching a support for one or more of wire, conduit, and cable to a slotted seat rail, said method comprising:
   hingedly attaching a first end of a base shell of a connector assembly to a first end of a clasp shell of the connector assembly by engaging a hinge pin formed on one of the base shell first end and the clasp shell first end with a retainer formed on the other of the base shell first end and the clasp shell first end, one of the base shell and the clasp shell including a threaded insert attached thereto;

inserting one of the first ends into a first slot of the slotted seat rail;

engaging a latch section formed on one of a second end of the clasp shell and a second end of the base shell with a clasp opening formed on the other of the clasp shell second end and the base shell second end, the latch section engaging the clasp opening within a second slot of the slotted seat rail, the second slot adjacent the first slot; and engaging the threaded insert with the support, the support including a threaded fastener operable for the engagement with the threaded insert, wherein the threaded insert is positioned between the hinge pin and the latch section.

9. The method of claim 8 further comprising configuring the clasp opening as a finger pull.

10. The method of claim 8 wherein engaging a latch section with a clasp opening comprises engaging a locking ledge of the clasp opening with a barb formed in the latch section.

11. The method of claim 8 wherein engaging a threaded insert with the support comprises providing an opening in at least one of the base shell and the clasp shell to provide access to the threaded insert therebetween.

12. The method of claim 8 wherein hingedly attaching a first end of a base shell of a connector assembly to a first end of a clasp shell of the connector assembly comprises hingedly attaching a base shell having a first longitudinal length to a clasp shell having a second longitudinal length, wherein the first longitudinal length and the second longitudinal length are not equal, but are greater than the distance separating the first slot and second slot of the slotted seat rail.

13. The method of claim 8 further comprising fabricating the base shell and the clasp shell from a plastic.

14. The method of claim 8, wherein engaging a latch section with a clasp opening comprises engaging the latch section with the clasp opening such that the base shell and clasp shell are removably coupled to one another at both the base shell and clasp shell first ends and the base shell and clasp shell second ends.

* * * * *